March 9, 1926.  1,576,339
P. B. LASKEY
METHOD OF MAKING POROUS CANDY
Filed Nov. 24, 1923  2 Sheets-Sheet 1

Inventor.
Philip B. Laskey
by Heard Smith & Tennant.
Attys

March 9, 1926.

P. B. LASKEY 1,576,339

METHOD OF MAKING POROUS CANDY

Filed Nov. 24, 1923     2 Sheets-Sheet 2

Inventor.
Philip B. Laskey
by Heard Smith & Tennant
Attys.

Patented Mar. 9, 1926.

1,576,339

UNITED STATES PATENT OFFICE.

PHILIP B. LASKEY, OF MARBLEHEAD, MASSACHUSETTS, ASSIGNOR TO CHOCOLATE SPONGE CO., INC., OF BROOKLYN, NEW YORK, A CORPORATION OF NEW YORK.

METHOD OF MAKING POROUS CANDY.

Application filed November 24, 1923. Serial No. 676,756.

*To all whom it may concern:*

Be it known that I, PHILIP B. LASKEY, a citizen of the United States, residing at Marblehead, county of Essex, State of Massachusetts, have invented an Improvement in Methods of Making Porous Candy, of which the following description, in connection with the accompanying drawing, is a specification, like characters on the drawing representing like parts.

This invention relates to a method of making porous candy of that type having cells or pores extending longitudinally thereof and it consists in forming a plurality of strips or streams of candy material which are longitudinally ribbed or longitudinally corrugated and then bringing the separated streams into adhering contact or causing them to coalesce to form a single candy structure having cells or pores extending longitudinally thereof, such cells or pores being formed by the junction of the ribbed or corrugated streams.

In the preferred way of practising my invention I first form the separated ribbed or corrugated streams of candy material and while the candy material is soft I draw or pull these separated streams to reduce their cross-sectional area and then bring the streams into adhering contact after they are thus drawn or pulled. If desired, the united streams may be acted on by a suitable cutter which indents them at intervals thus closing the pores or cells at the indented portions and trapping the air therein so that when the candy cools it will comprise closed cells having air trapped in them.

The separated streams of candy can be formed in various ways without departing from my invention.

In order to give an understanding of my invention I have shown in the drawings some ways of practising it which will now be described after which the novel features will be pointed out in the appended claims.

As stated above in carrying out my invention I first form a plurality of separated streams or strips of candy material, which streams or strips have corrugations or ribs extending longitudinally thereof, and while the streams or strips are in a tacky or sticky condition I bring them into adhering contact in such a way that longitudinal pores or cells will be formed between adjacent strips thus giving the desired porous candy.

Figure 1:
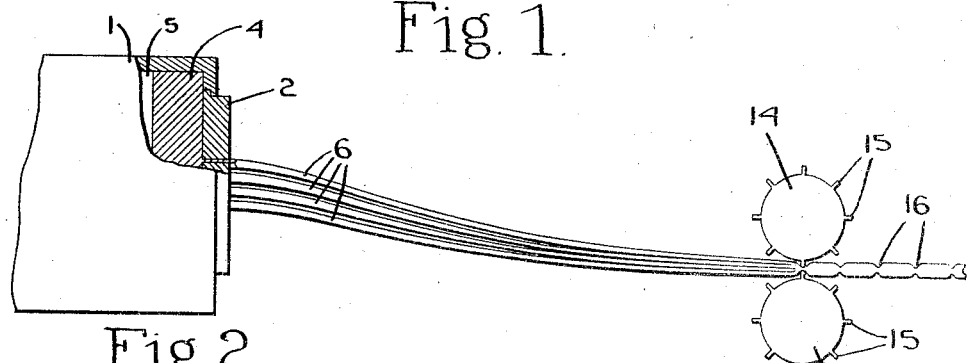
Fig. 1 is a more or less diagrammatic view illustrating one way of carrying out my improved process.
Figure 2:
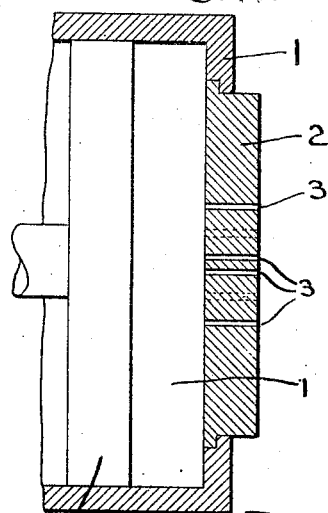
Fig. 2 is an enlarged sectional view through the die portion of the extruding machine shown in Fig. 1.

These separated streams may be formed by a rolling process or an extruding process or in various other ways without departing from the invention. In Fig. 1 I have shown the separate strips or streams as being formed by an extruding process and 1 indicates the cylinder or casing of an extruding machine which is provided with a die 2 having a plurality of openings 3 therethrough through which the candy material 4 is extruded by means of a plunger 5 as usual in extruding machines. The openings 3 are separated from each other and are of a shape to deliver streams 6 of candy material which are ribbed or corrugated longitudinally.

Figure 3:
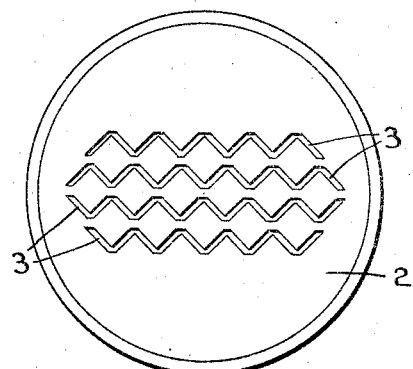
Figs. 3, 4 and 5 are views showing different forms of extruding dies which may be used in carrying out my improved process.
Figure 4:
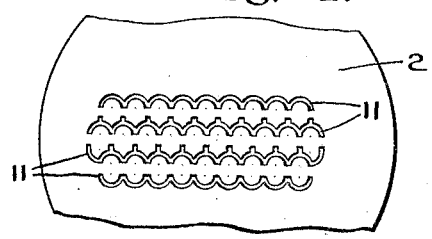
Figure 5:
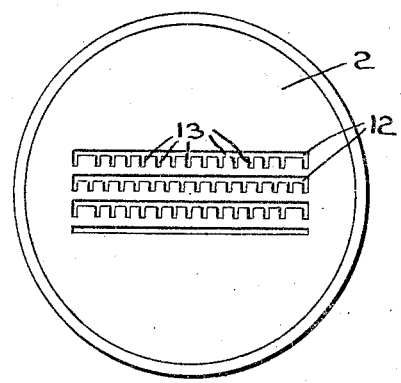
Figure 8:
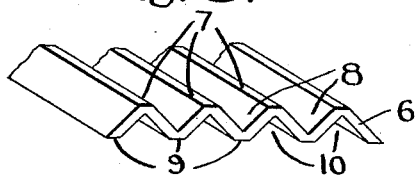
Fig. 8 is a perspective view of one of the streams of candy formed by the die shown in Fig. 3.

In Figs. 3, 4 and 5 I have illustrated different forms which this ribbed or corrugated effect may assume. In Fig. 3 each of the openings 3 in the die has a zig-zag shape. The candy stream or strip which is extruded from each of these openings will have the shape shown in Fig. 8, that is, on one face the candy strip will have ribs 7 and intermediate grooves 8 and on the other face will have the ribs 9 and intermediate grooves 10. The openings 3 are so disposed relative to each other that when the candy strips 6 are delivered from the die the ribs 9 of each strip will stand opposite the ribs 7 on the adjacent strip and the grooves 10 and 8 will also be opposite each other.

Figure 6:
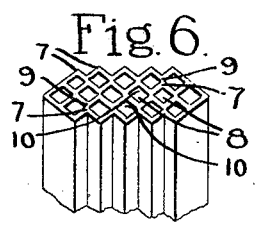
Fig. 6 is a perspective view of a piece of porous candy made according to my invention.
Figure 7:
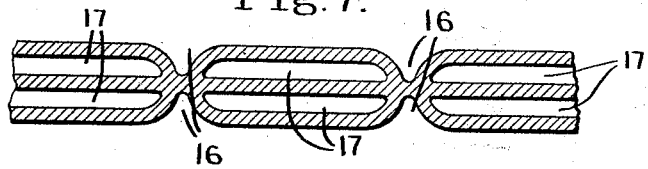
Fig. 7 is an enlarged sectional view taken longitudinally of a strip of candy made by the apparatus shown in Fig. 1.

The separate candy streams are in a tacky or sticky condition at the time they are delivered from the die and if they are brought into contact with each other at this time with the ribs 9 engaging the ribs 7 various streams will adhere to each other or coalesce thus making a complete candy structure such as illustrated in Fig. 6, in which the aligned grooves 8 and 10 form cells or openings extending longitudinally of the candy.

Figure 9:
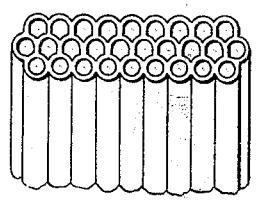
Figs. 9 and 10 are perspective views showing a candy structure made with the dies shown in Figs. 4 and 5 respectively.

As stated above the individual streams or strips of candy may have a great variety of contours each presenting the ribbed or corrugated feature. In Figs. 4 and 5 I have illustrated two other forms of die which may be used to produce this desired result. In Fig. 4 the openings through the die are indicated at 11 and these have a scalloped shape so that the streams 6 of candy material will be scalloped transversely. These openings are so disposed relative to each other that the scallops in one opening have a staggered relation to the scallops in an adjacent opening and when the several streams of candy produced by these openings 11 are brought together into adhering contact a cellular candy structure such as shown in Fig. 9 will be produced.

Figure 10:
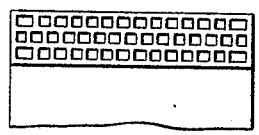

In Fig. 5 the die 2 has openings 12 each in the form of a slit with grooves 13 extending at right angles therefrom and the candy stream issuing from such an opening will be in the form of a sheet having longitudinally-extending ribs on one face. When a plurality of such streams are brought into contact the ribs of one stream adhere to the back of the adjacent stream thus forming a cellular candy structure as shown in Fig. 10.

There are, of course, a great many other shapes which the openings through the die may assume and which will produce the desired ribbed or grooved candy stream.

In practise I propose to make the openings 3 in the die of considerably greater cross-sectional area than is desired for the walls or partitions of the finished candy structure, such enlarged openings facilitating the extrusion operation. The candy streams which are thus extruded and of a larger cross-sectional area than desired in the finished candy are then drawn or pulled longitudinally thereby to reduce the cross-sectional area thereof. The ribbed or corrugated structure of the candy streams will be maintained during this longitudinal drawing or pulling operation and after the streams have been drawn or pulled to the desired cross-sectional area then they may be brought into adhering contact to form the completed candy structure.

The pulling of the candy may be accomplished in various ways and I have shown in Fig. 1 a pair of rotary combined pulling and cutting members 14 which are positively driven and which are situated at a proper distance from the extruding machine and operated at a proper speed to effect the necessary drawing or pulling of the candy streams.

These members 14 are provided with blades 15 which, acting on the candy serve to pull or draw the latter out, and also serve to bring the separate streams into adhering contact and to indent the candy structure as shown at 16. This indenting of the candy structure closes the pores or cells 17 at the place of indentation thus trapping the air in the cells with the result that the candy structure will maintain its cellular shape until it is hard.

In Figs. 9 and 10 I have illustrated perspective views similar to that shown in Fig. 6 but exhibiting the candy structure which would be formed by using the dies shown in Figs. 4 and 5 respectively. If the candy streams which are extruded from the die in Fig. 4 are drawn longitudinally and then brought into adhering contact a cellular candy structure such as shown in Fig. 9 will result while if the die shown in Fig. 5 is used and the resulting candy streams are brought into contact a structure such as shown in Fig. 10 will be produced.

Figure 11:
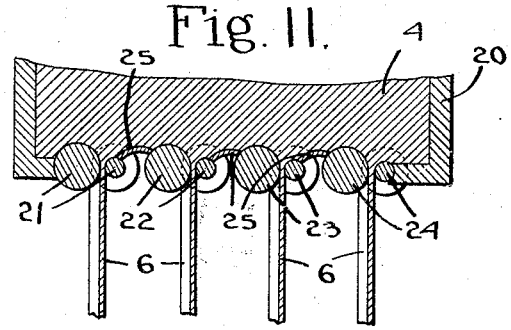
Fig. 11 is a view illustrating a different way of practising the invention in which the streams are formed by rolls instead of through an extruding die.

I have described the form of the candy streams by the extrusion process. These streams may also be formed in other ways as for instance by use of suitably shaped rolls. This is illustrated in Figs. 11, 12, 13 and 14. In Fig. 11 20 indicates a container for candy material having a plurality of pairs of rolls 21, 22 and 23 and 24 at its lower end, the rolls of each pair being positively driven in opposite directions so that the stream 6 of candy material will be delivered from the container between each pair of rolls.

The space between adjacent rolls of adjacent pairs is closed by a cover plate 24 so as to prevent the candy material from being delivered from the machine in any place except between the rolls.

Figure 12:
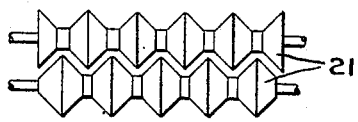
Fig. 12 illustrates the form of rolls required for forming separate streams similar to those formed by the die in Fig. 3.
Figure 13:
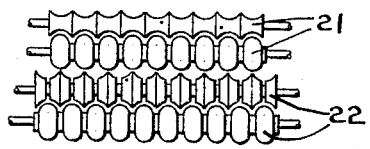
Fig. 13 shows the form or rolls required to make the candy streams of the same contour as those formed by the die shown in Fig. 4.
Figure 14:
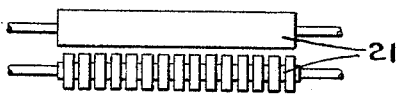
Fig. 14 is a view showing the rolls required to make the candy streams of the same contour as those formed by the die illustrated in Fig. 5.

The rolls of each pair will be properly shaped so that the streams 6 will have the desired ribbed or corrugated effect. In Fig. 12 I have shown the rolls shaped to produce a stream or strip of candy having the same shape as that which will be formed by the die shown in Fig. 3 and in Figs. 13 and 14 I have shown rolls adapted to make candy streams of the same shape as will be formed by the die shown in Figs. 4 and 5. Any other suitable way of forming these separate corrugated or ribbed streams may be employed without departing from the invention.

From the above it will be seen that my process includes the forming of a plurality of longitudinally corrugated streams of candy material and while candy material forming the streams is still in a tacky condition bringing said streams into adhering contact thereby to form a cellular candy structure. It will also be observed that in carrying out the process the candy streams may be formed of greater cross-sectional area than desired in the finished candy and the separate streams may be drawn or pulled longitudinally while still in separated relation thereby to reduce them to the desired cross-sectional area after which they may be brought into adhering or coalescing contact to produce the desired cellular candy structure.

I claim:

1. The process of making porous candy which consists in forming a plurality of separate longitudinal corrugated streams of candy material, pulling said streams of candy while they are separated and while the candy material forming the streams is still in a tacky condition, bringing portions of said elongated streams into adhering contact to form a cellular candy structure, and then further pulling said cellular candy structure.

2. In the art of making porous candy, those steps which consist in forming a plurality of separate and longitudinal corrugated streams of candy material and pulling the said streams so as to extend them, while the said streams are still separated from each other, and then bringing portions of the elongated streams into adhering contact to form a cellular candy structure.

In testimony whereof, I have signed my name to this specification.

PHILIP B. LASKEY.